(12) United States Patent
Kobsa

(10) Patent No.: US 6,418,178 B1
(45) Date of Patent: Jul. 9, 2002

(54) CONTROL ROD COUPLING ASSEMBLY FOR A NUCLEAR REACTOR

(75) Inventor: Irvin R. Kobsa, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,486

(22) Filed: Apr. 16, 2001

(51) Int. Cl.$^7$ .............................. G21C 7/06; G21C 7/36
(52) U.S. Cl. ....................................... 376/233; 376/216
(58) Field of Search .................................. 376/233, 228, 376/232; 294/906, 86.4; 403/60, 165, 348, 349

(56) References Cited

U.S. PATENT DOCUMENTS

| | | | | |
|---|---|---|---|---|
| 3,079,323 A | * | 2/1963 | Hawke | 204/193.2 |
| 3,604,746 A | * | 9/1971 | Notari | 294/90 |
| 3,720,580 A | * | 3/1973 | Schabert | 176/36 |
| 5,069,860 A | * | 12/1991 | Dillmann | 376/235 |
| 5,241,570 A | * | 8/1993 | Chalberg | 376/260 |
| 5,331,675 A | | 7/1994 | Hosoya et al. | |
| 5,570,399 A | | 10/1996 | Sakamaki | |
| 5,592,520 A | * | 1/1997 | Leford et al. | 376/233 |
| 5,761,260 A | | 6/1998 | Bergamaschi | |
| 5,778,034 A | | 7/1998 | Tani | |

* cited by examiner

Primary Examiner—Charles T. Jordan
Assistant Examiner—R Palabrica
(74) Attorney, Agent, or Firm—Armstrong Teasdale LLP

(57) ABSTRACT

A control rod coupling assembly for coupling a nuclear reactor control rod to a control rod drive mechanism is disclosed. The control rod drive mechanism includes an index tube and a bayonet head. The control rod includes blades and a tube at the intersection of the blades. The control rod coupling assembly includes a bayonet socket configured to receive the bayonet head, a shaft extending from the bayonet socket through the control rod, and a handle extending from the shaft, the handle movable to rotate the bayonet socket without rotation of the control rod.

24 Claims, 5 Drawing Sheets

CONTROL ROD COUPLING ASSEMBLY FOR A NUCLEAR REACTOR

BACKGROUND OF INVENTION

This invention relates generally to nuclear reactors and more particularly, to coupling apparatus for control rods in nuclear reactors.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud typically surrounds the core plate and is supported by a shroud support structure. Particularly, the shroud has a generally cylindrical shape and surrounds both the core plate and the top guide. The top guide comprises several openings, and fuel bundles are installed through the openings. Control rods are installed from above and operated from below.

A plurality of openings is formed in the bottom head dome so that components, such as control rod drive apparatus, can extend within the RPV. As an example, for a control rod drive apparatus, a control rod drive housing is inserted through the bottom head dome opening and a control rod drive mechanism (CRDM) is inserted through the control rod drive housing. The CRDM is coupled to the control rod. The CRDM facilitates positioning the control rod within the core.

A nuclear reactor core includes individual fuel assemblies that have different characteristics that affect the strategy for operation of the core. For example, a nuclear reactor core has many, up to several hundred, individual fuel bundles that have different characteristics. Such bundles preferably are arranged within the reactor core so that the interaction between the fuel bundles satisfies all regulatory and reactor design constraints, including governmental and customer specified constraints. The core loading arrangement determines the cycle energy, or the amount of energy that the reactor core generates before the core needs to be refueled with new fuel elements. In addition to satisfying the design constraints, the core loading arrangement preferably optimizes the core cycle energy.

In order to furnish the required energy output, the reactor core is periodically refueled with fresh fuel assemblies. The most depleted fuel bundles, which include the bundles with the least remaining energy content, are removed from the reactor. Control rods, containing neutron absorbing material, may also be replaced during refuelings. Typically the control rod is disconnected from the CRDM and removed from the RPV, leaving the CRDM in place.

Control rods control the excess reactivity in the reactor. Specifically, the reactor core contains control rods which assure safe shutdown and provide the primary mechanism for controlling the maximum power peaking factor. The total number of control rods available varies with core size and geometry, and is typically between 50 and 200. The position of the control rods, for example, fully inserted, fully withdrawn, or somewhere between, is based on the need to control the excess reactivity and to meet other operational constraints, such as the maximum core power peaking factor.

The control rod is moved vertically by the CRDM to control excess reactivity. In one known reactor design, horizontal and rotational motion of the control rod is constrained by a control rod guide tube. In such design control rods cannot be rotated even after fuel bundle removal due to the control rod guide tube and supporting lattice structure.

The control rod is connected to the CRDM with a coupling assembly to allow removal of the control rod from the reactor core. In one known reactor design, a bayonet coupling is used, requiring rotation of the control rod to effect uncoupling.

It would be desirable to provide a coupling assembly that precludes inadvertent uncoupling of the control rod from the CRDM, but enables uncoupling of the control rod from the CRDM without rotation of the control rod. It also would be desirable to enable uncoupling of the control rod from the CRDM from above the reactor core without removal, rotation or maintenance of the CRDM from below the reactor.

SUMMARY OF INVENTION

In an exemplary embodiment, a control rod apparatus includes a control rod, a CRDM, and a coupling assembly. The control rod includes at least one blade and a longitudinal tube. The CRDM includes an index tube with a bayonet head secured to one end of the index tube. The coupling assembly includes a bayonet socket sized to receive the bayonet head. The coupling assembly also includes a shaft extending from the bayonet socket through the longitudinal tube of the control rod. A handle extends from an end of the shaft opposite the bayonet socket. Rotation of the handle rotates the shaft and the bayonet socket, with substantially no rotation of the control rod.

In use, the control rod, with the coupling assembly in the longitudinal tube, is lowered onto the CRDM so that the bayonet head is received into the bayonet socket. The handle is rotated, rotating the shaft, and thus the bayonet socket. The control rod does not rotate. In an exemplary embodiment, about 45 degrees of handle rotation fully engages the bayonet socket to the bayonet head, and aligns the handle with a control rod blade.

The above-described coupling assembly facilitates control rod removal, inspection and replacement for reducing out of service maintenance periods. In addition, the above-described coupling assembly facilitates improved reliability of the control rod apparatus.

DETAILED DESCRIPTION

Figure 1:
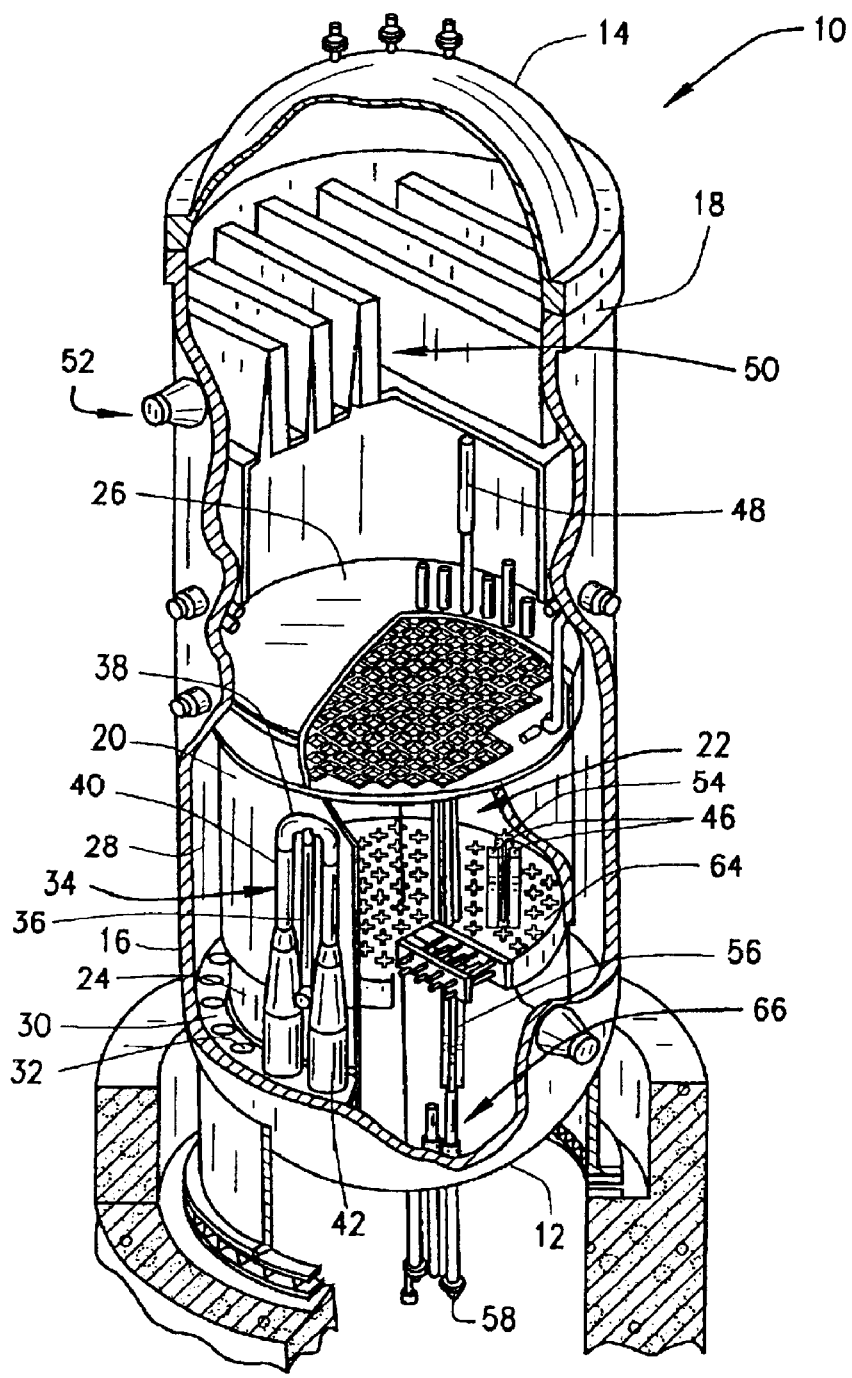
FIG. 1 is a sectional view, with parts cut away, of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes an opposed removable shroud head 26. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes fuel bundles 46 of fissionable material. Water circulated up through core 22 is at least partially converted to steam. Steam separators 48 separates steam from water, which is recirculated. Steam dryers 50 remove residual water from the steam. The steam exits RPV 10 through a steam outlet 52 near vessel top head 14.

The amount of heat generated in core 22 is regulated by inserting and withdrawing a plurality of control rods 54 of neutron absorbing material, for example, hafnium. To the extent that control rod 54 is inserted adjacent fuel bundle 46, it absorbs neutrons that would otherwise be available to promote the chain reaction which generates heat in core 22.

Figure 3:
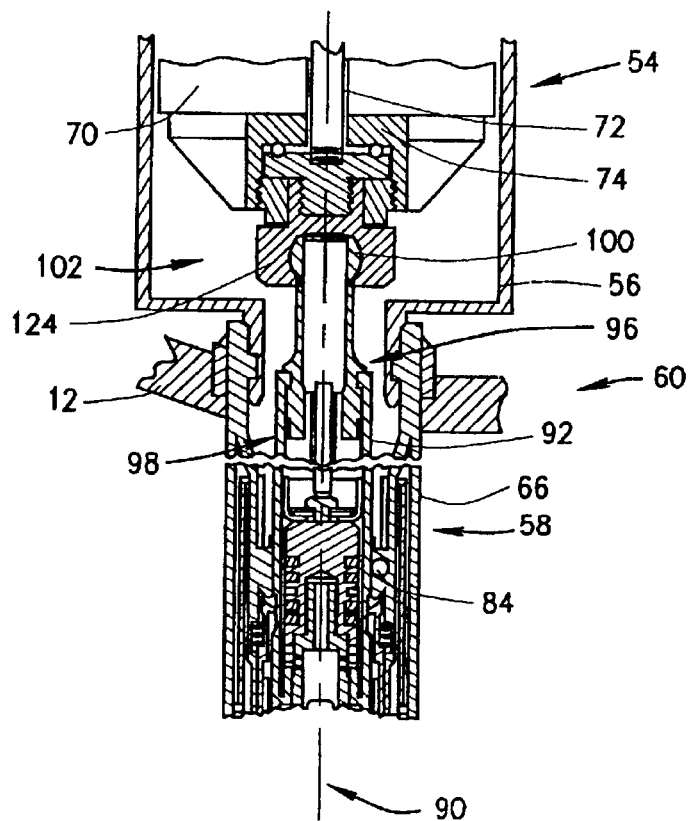
FIG. 3 is a partial cross sectional view of a control rod apparatus shown in FIG. 1 in accordance with an embodiment of the present invention.

Control rod 54 couples with a control rod drive mechanism (CRDM) 58 to form a control rod apparatus 60 (shown in FIG. 3). CRDM 58 moves control rod 54 relative to a core support plate 64 and adjacent fuel bundles 46. CRDM 58 extend through bottom head 12 and is enclosed in a control rod drive mechanism housing 66. A control rod guide tube 56 extends vertically from control rod drive mechanism housing 66 to core support plate 64. Control rod guide tubes 56 restrict non-vertical motion of control rods 54 during control rod 54 insertion and withdrawal. Control rod guide tube 56 has a cruciform shape. In alternative embodiments control rod guide tube 56 can have other shapes, for example cylindrical, rectangular, or Y-shaped.

Figure 2:
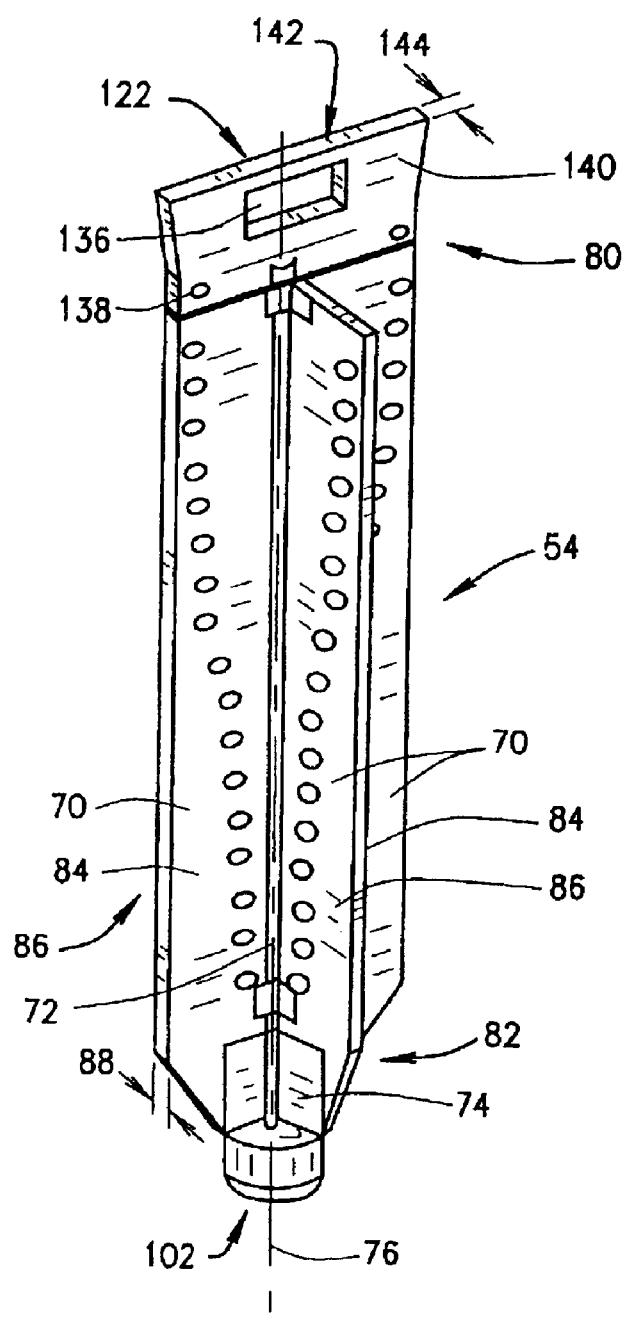
FIG. 2 is a perspective side view of a control rod shown in FIG. 1 in accordance with an embodiment of the present invention.

FIG. 2 is a perspective side view of control rod 54. Control rod 54 includes at least one blade 70, a longitudinal tube 72 at the intersection of blades 70, a hub 74 coupled to blades 70, and a longitudinal axis 76 aligned with longitudinal tube 72. Control rod 54 further includes an upper end 80 and a lower end 82. In an exemplary embodiment, control rod 54 includes four radially extending blades 70 in a cruciform shape. In an alternative embodiment, control rod 54 includes other blade configurations, including for example, a Y-shaped blade configuration (not shown). Blades 70 intersect at longitudinal tube 72. Longitudinal tube 72 extends the length of control rod 54, including through hub 74. Hub 74 is integrally attached to blades 70 at lower end 82 of control rod 54. Any suitable material can be used for hub 74, for example, stainless steel XM19 or Ni—Cr—Fe alloy X-750. These alloys provide high strength and provide corrosion resistance in the environment of a boiling water nuclear reactor.

Each blade 70 includes a first surface 84, a second surface 86, and a blade thickness 88 between first surface 84 and second surface 86. Blades 70 contain a neutron absorbing material (not shown) between first surface 84 and second surface 86 in a sealed, corrosion resistant condition allowing for an extended useful period.

FIG. 3 is a schematic, partial cross sectional view of control rod apparatus 60. CRDM 58 includes a drive axis 90, an index tube 92 and a restraining device 94. Index tube 92 includes a first end 96 and an outer surface 98. A bayonet head 100 is secured to first end 96. Restraining device 94 engages index tube 92. In an exemplary embodiment, CRDM 58 is operated by a hydraulic motive system (not shown). CRDM 58 is operated to axially position index tube 92. In an alternative embodiment, a mechanical screw-type motive system (not shown) operates CRDM 58. Index tube 92 retractably extends through control rod drive mechanism housing 66 into control rod guide tube 56 to position control rod 54. Control rod apparatus 60 further includes a control rod coupling assembly 102 which releasably couples CRDM 58 and control rod 54, and is shown at lower end 82 (shown in FIG. 2) of control rod 54.

Figure 4:
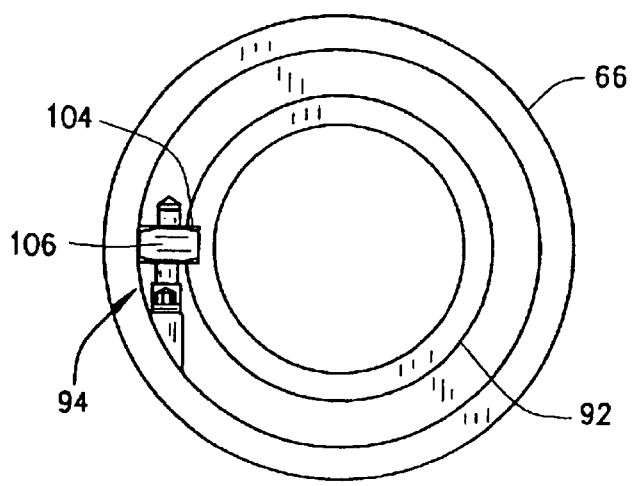
FIG. 4 is a cross sectional view of an index tube shown in FIG. 3.

FIG. 4 is a cross sectional view of an index tube 92. Index tube outer surface 98 includes an axial channel 104. Restraining device 94 includes a roller key 106 secured to control rod drive mechanism housing 66 slidably engaged in axial channel 104. Restraining device 94 engages index tube 92 so as to restrict rotational movement, while allowing vertical motion.

Figure 5:
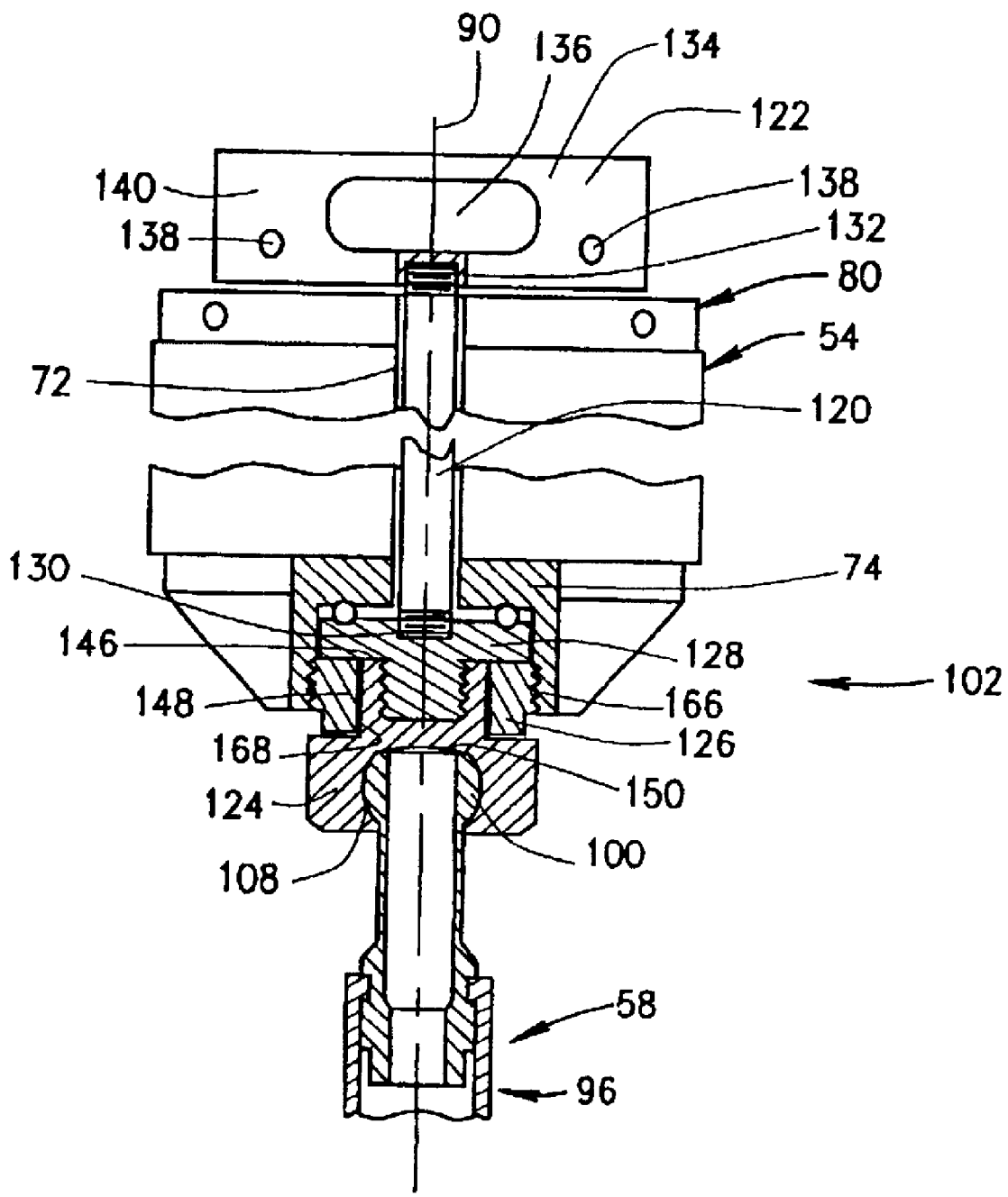
FIG. 5 is an enlarged, schematic, partial cross-sectional view of the control rod apparatus shown in FIG. 3.

FIG. 5 is an enlarged, schematic, partial cross-sectional view of control rod apparatus 60. Coupling assembly 102 releasably couples control rod 54 to CRDM 58. Coupling assembly 102 includes a shaft 120, a handle 122, and a bayonet socket 124. In one embodiment, coupling assembly 102 further includes an external hex nut 126 attached to hub 74 and an axial bearing 128. Axial bearing 128 is coupled to bayonet socket 124 and shaft 120. Axial bearing 128 abuts hub 74 to reduce friction between the control rod 54 and the coupling assembly 102. In another embodiment (not shown), shaft 120 secures directly to bayonet socket 124.

Referring to FIGS. 2 and 5, shaft 120 includes a proximate end 130 and a distal end 132. Shaft 120 is received in and extends axially through longitudinal tube 72 of control rod 54. Shaft 120 is free to rotate in longitudinal tube 72. Proximate end 130 extends through hub 74. Distal end 132 of shaft 120 extends through control rod upper end 80.

Handle 122 is threadedly coupled to distal end 132 of shaft 120. In alternative embodiments, handle 122 can be secured to shaft 120 by other suitable attachments, for example, by fasteners. Handle 122 is detachable from shaft 120 and includes a plate 134 and an opening 136. In alternative embodiments, handle 122 can include other configurations, for example, handle 122 can include other suitable shapes. For example, handle 122 can include a rod forming a closed loop (not shown) with shaft 120. Handle 122 further includes roller mechanisms 138 to facilitate operation between fuel bundles 46 (as shown in FIG. 1). In an alternative embodiment, roller mechanisms 138 are not included in handle 122.

Referring to FIGS. 2 and 5, handle 122 further includes a first side 140 and a second side 142, and a handle thickness 144 between first side 140 and second side 142. Handle thickness 144 is about equal to or less than blade thickness 88 to facilitate use in reactor core 22. Handle 122 facilitates rotation of shaft 120 in longitudinal tube 72.

Referring to FIG. 5, axial bearing 128 is secured to bayonet socket 124 and shaft 120. Bayonet socket 124 includes an upper end 146, a cylindrical body 148, and a coupling cavity 150. Axial bearing 128 is disposed between upper end 146 and hub 74 and rotatably engages hub 74 to facilitate rotation of bayonet socket 124. Axial bearing 128 is threadedly and detachably secured to bayonet socket 124. Axial bearing 128 is also threadedly and detachably secured to shaft 120.

External hex nut 126 includes an outer portion 152 (shown in FIG. 6) attached to hub 74 and an inner wall 154 circumferentially enclosing cylindrical body 148 of bayonet socket 124. Cylindrical body 148 is free to rotate within hex nut 126 while bayonet socket 124 is retained by hex nut 126.

Axial bearing 128 is secured to bayonet socket upper end 146. Axial bearing 128 is disposed between upper end 146 and hub 74 and rotatably engages hub 74 to facilitate rotation of bayonet socket 124. Axial bearing 128 is threadedly and detachably secured to bayonet socket 124. Axial bearing 128 is also threadedly and detachably secured to shaft 120.

Figure 6:
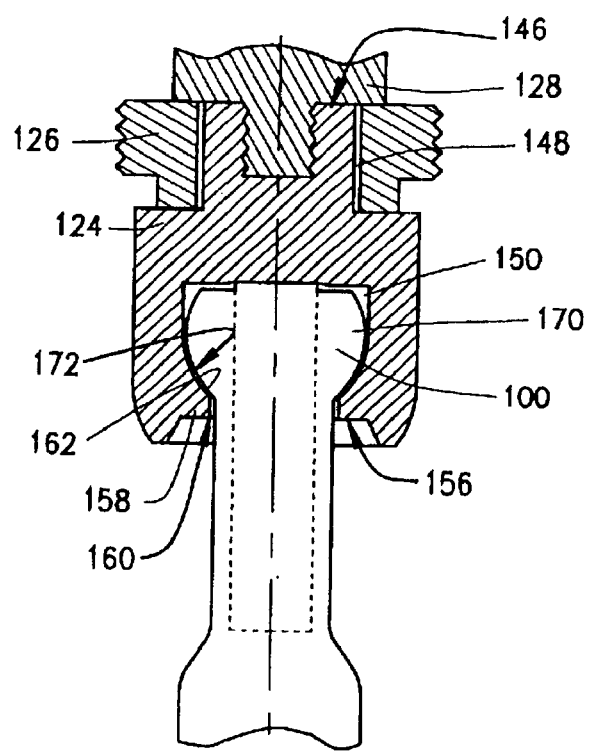
FIG. 6 is an enlarged view of a bayonet head engaged in a bayonet socket as shown in FIG. 5

FIG. 6 is a side view of bayonet head 100 engaged with bayonet socket 124. Referring to FIGS. 5 and 6, bayonet socket 124 further includes an internal engagement flange 156 comprising four arcuate segments 158 forming an engagement aperture 160. Upper end 146 is secured to axial bearing 128, which is threadedly secured to proximate end 130 of shaft 120. In another embodiment, upper end 146 of bayonet socket 124 is threadedly secured to proximate end 130 of shaft 120 without axial bearing 128. Each segment 158 subtends slightly less than 45 degrees of radial arc. In alternative embodiments, as described below, different numbers of segments, with different arc spans can be used. Each segment 158 includes an internal face 162. Internal faces 162 are arcuate to facilitate engagement with bayonet head 100. Bayonet socket 124 is fabricated from any suitable material including, for example, stainless steel XM19 or Ni—Cr—Fe alloy X-750. These alloys provide high strength, permitting minimum size and weight of bayonet socket 124, and provide corrosion resistance in the environment of a boiling water nuclear reactor.

Figure 7:
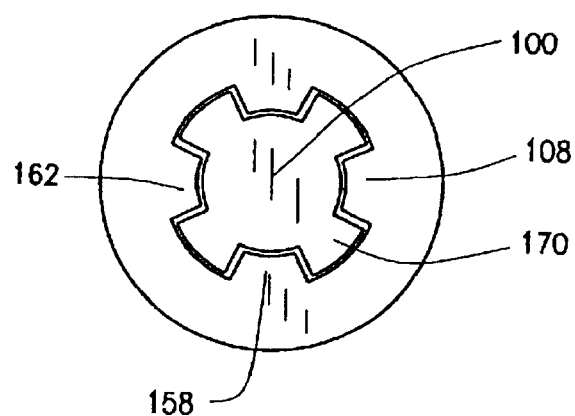
FIG. 7 is a top view of the bayonet socket disengaged from the bayonet head of FIG. 6.

Bayonet head 100 extends from index tube first end 96. Bayonet head 100 includes four members 170 in a cruciform arrangement. FIG. 7 is a top view of bayonet socket 124 disengaged from the bayonet head 100. Each member 170 subtends slightly less than 45 degrees of radial arc, complementary to segments 158. Each member 170 also includes a lower surface 172. In alternative embodiments, a different number of members is used, including for example, two members 170 each subtending about 90 degrees of radial arc, complementary to two segments 158. Lower surfaces 172 are convex to facilitate engagement with internal faces 162 of socket 124. In another embodiment, lower surfaces 172 and internal faces 162 include other complementary shapes. Bayonet head 100 is also fabricated from any suitable material including, for example, stainless steel XM19 or Ni—Cr—Fe alloy X-750. These alloys provide high strength, permitting minimum size and weight of bayonet head 100, and provide corrosion resistance in the environment of a boiling water nuclear reactor.

In operation, coupling assembly 102 facilitates a secure coupling of control rod 54 to CRDM 58 that precludes inadvertent uncoupling of control rod 54 from CRDM 58, while allowing uncoupling of control rod 54 from CRDM 58 for maintenance without rotation of control rod 54. Using standardized procedures for reactor maintenance, and with top head 14 and other components removed, a tool (not shown) is lowered to grasp handle 122. The tool then rotates handle 122, rotating shaft 120 in longitudinal tube 72 and rotating bayonet socket 124 about bayonet head 100. Restraining device 94 restricts rotation of index tube 92 and bayonet head 100. As handle 122 is rotated segments 158 disengage from members 170. segments 158 complete disengagement after about 45 degrees of rotation. FIG. 7 shows bayonet socket 124 and bayonet head 100 in a disengaged condition. Control rod 54 is uncoupled from CRDM 58 and is lifted from control rod guide tube 56.

Installation and coupling of control rod 54 to CRDM 58 requires a similar operation. Supported by a tool (not shown) grasping handle 122, control rod 54 is lowered into control rod drive tube 56. Bayonet head 100 is received through engagement aperture 160 into coupling cavity 150 of bayonet socket 124. Internal faces 162 of segments 158 are below members 170. Handle 122 is rotated by the tool, causing rotation of shaft 120, and thus rotation of bayonet socket 124. Internal faces 162 rotate to engage lower surfaces 172. Rotation of about 45 degrees aligns handle 122 substantially co-planar with blade 70 and completes engagement of segments 158 with members 170. FIG. 6 shows bayonet head 100 engaged in bayonet socket 124.

It is to be understood that the present invention is not limited to a bayonet socket with four segments coupling to a bayonet head with four members. Alternative configurations using other complementary arrangements of segments and members could be utilized.

The above described coupling assembly 102 facilitates installation and removal of control rods 54 while providing reliable coupling of control rod 54 and CRDM 58. Coupling assembly 102 ensures retention and control of control rod 54 while facilitating rotation of bayonet socket 124 during maintenance procedures. Coupling assembly 102 is particularly advantageous where rotation of control rod 54 is restricted after fuel bundles 46 are removed. In addition, coupling assembly 102 facilitates replacement of control rod 54 when less than all adjacent fuel bundles 46 are removed, and does not require removal of CRDM 58. Furthermore, coupling assembly 102 can improve reliability and reduce maintenance time, as compared to a conventional control rod apparatus, with an overall reduction in maintenance cost and reduced outage time.

While the invention has been described in terms of various specific embodiments, those skilled in the art will recognize that the invention can be practiced with modification within the spirit and scope of the claims.

What is claimed is:

1. A control rod coupling assembly for coupling a nuclear reactor control rod to a control rod drive mechanism, the control rod drive mechanism comprising an index tube and a bayonet head, said control rod coupling assembly comprising:

a control rod comprising a longitudinal tube and at least one blade extending from the tube, said longitudinal tube extending the length of said control rod;

a bayonet socket configured to receive the bayonet head;

a shaft extending from said bayonet socket, said shaft extending longitudinally through said longitudinal tube of said control rod; and a handle extending from said shaft, said handle movable to rotate said bayonet socket without rotating said control rod.

2. A control rod coupling assembly in accordance with claim 1 wherein said shaft is removably attached to said handle.

3. A control rod coupling assembly in accordance with claim 1 wherein said shaft is removably attached to said bayonet socket.

4. A control rod coupling assembly in accordance with claim 1 wherein said handle comprises a roller mechanism.

5. A control rod coupling assembly in accordance with claim 1 wherein said handle comprises a plate and at least one opening.

6. A control rod coupling assembly in accordance with claim 1 wherein said bayonet socket further comprises a coupling cavity and an internal engagement flange defining an engagement aperture, said coupling cavity configured to receive the bayonet head through said engagement aperture, and said internal engagement flange configured to abut the bayonet head upon rotation of said bayonet socket.

7. A control rod apparatus in accordance with claim 6 wherein said internal engagement flange comprises four arcuate segments, each said segment subtending substantially about 45 degrees of radial arc.

8. A control rod apparatus in accordance with claim 7 wherein said segments comprise an internal face.

9. A control rod coupling assembly in accordance with claim 1 wherein said control rod coupling assembly further comprises an external hex nut rotatably and circumferentially enclosing said bayonet socket.

10. control rod coupling assembly in accordance with claim 1 wherein said control rod coupling further comprising at least one bearing coupled to said bayonet socket, said bearing disposed around said shaft.

11. A control rod apparatus comprising:
  a control rod comprising at least one blade and a longitudinal tube, said longitudinal tube extending the length of said control rod;
  a control rod drive mechanism comprising an index tube, said index tube having a first end, and a bayonet head secured to said first end, said bayonet head comprising a lower surface; and
  a coupling assembly comprising:
    a bayonet socket sized to receive said bayonet head;
    a shaft extending axially from said bayonet socket through said longitudinal tube; and
    a handle extending from said shaft distal from said bayonet socket, said handle movable to rotate said bayonet socket without rotating said control rod.

12. A control rod apparatus in accordance with claim 11 wherein said bayonet socket comprises a coupling cavity and an internal engagement flange defining an engagement aperture, said coupling cavity sized to receive said bayonet head through said engagement aperture and said internal engagement flange configured to abut said bayonet head upon rotation of said bayonet socket.

13. A control rod apparatus in accordance with claim 12 wherein said handle is substantially coplanar with said at least one blade when said internal engagement flange fully engages said lower surface of said bayonet head.

14. A control rod apparatus in accordance with claim 11 wherein said control rod drive mechanism further comprises at least one restraining device engaging said index tube so as to prevent rotation of said index tube.

15. A control rod apparatus in accordance with claim 14 wherein said restraining device comprises a roller key slidably engaged in an axial channel of said index tube so as to prevent rotation of said index tube.

16. A control rod apparatus in accordance with claim 11 wherein said coupling assembly further comprises an external hex nut rotatably and circumferentially enclosing said bayonet socket.

17. A control rod apparatus in accordance with claim 16 wherein said control rod further comprises a hub, said hub coupled to said external hex nut and to said at least one blade.

18. A control rod apparatus in accordance with claim 17 wherein said coupling assembly further comprising a bearing coupled to said bayonet socket and to said hub, to facilitate rotation of said bayonet socket.

19. A control rod apparatus in accordance with claim 11 wherein said at least one blade comprises a blade thickness, said handle comprises a handle thickness substantially equal to or less than said blade thickness.

20. A control rod apparatus in accordance with claim 11 wherein said handle comprises a roller mechanism.

21. A control rod apparatus in accordance with claim 11 wherein said handle comprises at least one opening.

22. A control rod apparatus in accordance with claim 12 wherein said bayonet head comprises four members in a cruciform configuration, each said member subtending substantially about 45 degrees of arc.

23. A control rod apparatus in accordance with claim 22 wherein said internal engagement flange comprises four arcuate segments, each said segment subtending substantially about 45 degrees of arc, complementary to said bayonet head.

24. A control rod apparatus comprising:
  a control rod comprising at least one generally planar blade, a longitudinal axis, and a longitudinal tube substantially aligned with said axis, said longitudinal tube extending the length of said control rod;
  a control rod drive mechanism comprising an index tube having a first end, a restraining device securing said index tube, and a bayonet head secured to said first end, said bayonet head comprising four members in a cruciform arrangement, each member subtending substantially about 45 degrees of arc, each of said members including a lower surface; and
  a coupling assembly comprising a shaft including a proximate end and a distal end, received in and extending axially through said longitudinal tube, a handle detachably secured to said distal end of said shaft, and a bayonet socket, detachably secured to said proximate end of said shaft, said bayonet socket including a coupling cavity and an internal engagement flange defining an engagement aperture comprising four arcuate segments, each segment subtending substantially about 45 degrees of arc, complementary to said members;
  said coupling cavity sized to receive said bayonet head through said engagement aperture, such that upon rotation of said handle, said shaft rotates in said tube and said bayonet socket rotates, said internal engagement flange engages said lower surface of said bayonet head with substantially no rotation of said control rod;
  said handle substantially co-planar with at least one blade of said control rod when said members fully engage said segments.

* * * * *